(12) United States Patent
Redjebian

(10) Patent No.: US 12,502,215 B2
(45) Date of Patent: Dec. 23, 2025

(54) BRIDGE PFA BIPHASIC GENERATOR FOR ELECTROPORATION USING FINITE ENERGY TRANSFER

(71) Applicant: Boston Scientific Scimed, Inc., Maple Grove, MN (US)

(72) Inventor: Berj Redjebian, Laval (CA)

(73) Assignee: Boston Scientific Scimed, Inc., Maple Grove, MN (US)

( * ) Notice: Subject to any disclaimer, the term of this patent is extended or adjusted under 35 U.S.C. 154(b) by 302 days.

(21) Appl. No.: 18/319,348

(22) Filed: May 17, 2023

(65) Prior Publication Data

US 2023/0389984 A1     Dec. 7, 2023

Related U.S. Application Data

(60) Provisional application No. 63/348,089, filed on Jun. 2, 2022.

(51) Int. Cl.
    *A61B 18/12*        (2006.01)
    *A61B 18/14*        (2006.01)
    (Continued)

(52) U.S. Cl.
    CPC ......... *A61B 18/1492* (2013.01); *H03K 3/537* (2013.01); *A61B 2018/00351* (2013.01); *A61B 2018/00577* (2013.01)

(58) Field of Classification Search
    CPC ...... A61B 18/1233; A61B 2018/00613; A61B 2018/124; A61B 2018/1492
    See application file for complete search history.

(56) References Cited

U.S. PATENT DOCUMENTS 7,994,729 B2    8/2011    Redjebian
8,145,300 B2    3/2012    Powers
(Continued)

FOREIGN PATENT DOCUMENTS

CN         115252111 A     11/2022
WO     2010/107947 A1     9/2010

OTHER PUBLICATIONS

International Search Report for PCT Application No. PCT/US2023/022576 mailed Aug. 18, 2023. 6 pages.
(Continued)

*Primary Examiner* — Daniel W Fowler
(74) *Attorney, Agent, or Firm* — Nelson Mullins Riley & Scarborough LLP

(57) ABSTRACT

A pulse phase ablation biphasic PFA generator with finite energy source and delivery mechanism is disclosed, comprising: a signal source configured to output electrode input signals; a trigger circuit configured to trigger signals; at least one electrode channel circuit including a charge transfer source circuit including a source capacitor and coupled to the signal source to receive the electrode input signals, the charge transfer source circuit being configured to charge the source capacitor to a source voltage, a switching circuit coupled to charge transfer source circuit to receive the source voltage and to the trigger circuit to receive the trigger signals, and a charge transfer load circuit including a load capacitor coupled to the switching circuit; wherein the switching circuit further includes a plurality of spark gap switches activated by the trigger signals to cause the electrode channel to apply a biphasic waveform to electrodes configured to contact tissue.

20 Claims, 12 Drawing Sheets

(51) Int. Cl.
*H03K 3/537* (2006.01)
*A61B 18/00* (2006.01)

(56) References Cited

U.S. PATENT DOCUMENTS

| | | | |
|---|---|---|---|
| 8,709,006 | B2 | 4/2014 | Juergen et al. |
| 2009/0210022 | A1 | 8/2009 | Powers |
| 2011/0106221 | A1* | 5/2011 | Neal, II ................. A61B 18/12 |
| | | | 607/2 |
| 2012/0143273 | A1 | 6/2012 | Stubbs et al. |
| 2014/0052126 | A1* | 2/2014 | Long ................. A61B 18/1492 |
| | | | 606/34 |
| 2017/0245928 | A1 | 8/2017 | Xiao et al. |
| 2019/0230779 | A1* | 7/2019 | Sanders ............ H01J 37/32174 |
| 2019/0269912 | A1 | 9/2019 | Viswanathan |
| 2020/0230403 | A1 | 7/2020 | Bowers et al. |
| 2020/0289188 | A1* | 9/2020 | Forsyth .............. A61B 18/1206 |
| 2021/0022794 | A1 | 1/2021 | Viswanathan |
| 2021/0077188 | A1 | 3/2021 | Long et al. |
| 2021/0106374 | A1* | 4/2021 | Forsyth ................ A61B 5/4836 |

OTHER PUBLICATIONS

Redondo, L.M. et al, Redondo L.M. et al., "Solid-State Generation of High-Frequency Burst of Bipolar Pulses for Medical Applications", IEEE Transactions on Plasma Science, IEEE Service Center, Piscataway, NJ, US, vol. 47, No. 8, Aug. 1, 2019, pp. 4091-4095. DOI: 10.1109/TPS.2019.2923570.

* cited by examiner

BRIDGE PFA BIPHASIC GENERATOR FOR ELECTROPORATION USING FINITE ENERGY TRANSFER

CROSS REFERENCE TO RELATED APPLICATIONS

This application claims the benefit of U.S. Provisional Patent Application No. 63/348,089, filed Jun. 2, 2022, which is incorporated herein by reference in its entirety.

TECHNICAL FIELD

The present disclosure relates to pulse field ablation ("PFA"), and more specifically, to charge delivery devices and methods for PFA that deliver biphasic waveforms using spark gap switches for irreversible electroporation ("IRE").

BACKGROUND

The generation of pulsed electric fields for tissue ablation has moved from the laboratory to the clinic over the past two decades. Generally, to ablate tissue, one or more catheters having one or more electrodes may be advanced in a minimally invasive fashion through vasculature to a target tissue location. In a cardiac application, the electrodes through which a voltage pulse waveform is delivered may be disposed on an epicardial device or on an endocardial device. Application of brief, high DC voltages to the tissue may generate locally high electric fields typically in the range of hundreds of volts per centimeter that disrupt cell membranes by generating pores in the cell membrane. While the precise mechanism of this electrically-driven pore generation or electroporation continues to be studied, it is thought that the application of relatively brief and large electric fields generates instabilities in the lipid bilayers in cell membranes, causing the occurrence of a distribution of local gaps or pores in the cell membrane. Such electroporation may be irreversible if the applied electric field at the membrane is larger than a threshold value, leading to the pores remaining open, thereby leading to necrosis and/or apoptosis (cell death).

Conventionally, an H-bridge topology has been used to conduct PFA biphasic waveform delivery which requires the use of large bulk capacitors that dramatically increase the physical size of the console. The combination of series bulk capacitors in a typical H-bridge generator increases the equivalent series resistance ("ESR") and the equivalent series inductance ("ESL") characteristics of the supply source by a factor of n (the number of capacitors) and size of Q=CV holding capacity. Moreover, the large amount of energy stored in the high voltage capacitors cannot be discharged immediately upon powering off the system, thereby posing a risk. Also, the barrier isolation needs to be enhanced using higher dielectric strength components and isolation transformers. With many conventional systems, the delivery of a known amount of energy would require standby impedance scanning, adding to the complexity of the system. Measurement errors and variations in contact impedance, voltage and current may contribute to differences between the perceived tissue impedance and the actual impedance. That is, the overall energy transfer to the tissue and efficacy of the therapy may be adversely impacted from the moment of scanning tissue impedance to the moment of delivery of the therapy. Additionally, providing a system that complies with the medical device safety standard IEC-60601-1 in terms of isolation requirements for level 2 means of patient protection ("MOPP") and level 2 means of operator protection ("MOOP") adds difficulty using the conventional approach.

Other drawbacks of conventional approaches for providing PFA waveform delivery include the need for precision and synchronous current and voltage sensing to provide control loop feedback, and the inability of dedicating an H-bridge generator to each electrode because of the cost and complexity of the high voltage, high current switching devices. Additionally, the centralized configuration of switching electrodes hinders the therapy to be applied within the same cardiac rhythm time period. Further in terms of safety, the fault modes created in the console rely on feedback control to reduce the amount of voltage and energy applied. The risk of user shock is greatly reduced if the amount of energy held is localized and limited to a specific therapy amount.

In view of the foregoing, there is clearly a need for a simplified, cost effective approach to PFA in electroporation that provides a fail-proof, hazard reducing system with reduced size and complexity and lower cost that delivers a finite amount of charged energy with high efficacy and flexibility as well as inherent patient and operator isolation.

SUMMARY

According to one embodiment of the present disclosure, a pulse phase ablation biphasic generator is provided, comprising: a signal source circuit including a power supply and an electrode switch block configured to output a plurality of switched electrode input signals; a trigger circuit including a transformer configured to output a plurality of high voltage trigger signals; at least one electrode channel circuit including a charge transfer source circuit including a source capacitor and coupled to the signal source circuit to receive the plurality of switched electrode input signals, the charge transfer source circuit being configured to charge the source capacitor to a source voltage, a switching circuit coupled to charge transfer source circuit to receive the source voltage and to the trigger circuit to receive the plurality of high voltage trigger signals, and a charge transfer load circuit including a load capacitor coupled to the switching circuit; wherein the switching circuit further includes a plurality of spark gap switches activated by the plurality of high voltage trigger signals to cause the electrode channel to apply a biphasic waveform to a pair of electrodes configured to contact tissue, the biphasic waveform including a positive phase generated by discharging the source voltage of the source capacitor and a negative phase generated by discharging the load capacitor. In one aspect of this embodiment, the switching circuit further includes two waveshaping inductors coupled to source capacitor. In a variant of this aspect, one inductor is coupled to a first spark gap switch and another inductor is coupled to a second spark gap switch. In another aspect, the charge transfer circuit includes a switch controlled by a controller to remain in an ON conduction state for as long as there is a current imbalance between the electrode input signal and the source capacitor. In a variant of this aspect, the switch is a one of a TRIAC, IGBT or MOSFET. In yet another aspect of this embodiment, a first spark gap switch receives a first high voltage trigger signal to begin application of the positive phase of the biphasic waveform to the pair of electrodes and to begin charging the load capacitor. In a variant of this aspect, a second spark gap switch receives a second high voltage trigger signal to shunt delivery of the positive phase of the biphasic waveform. In a further variant, after a pause period, a third spark gap switch receives a third high voltage trigger signal to provide the negative phase of the biphasic waveform by discharging the load capacitor of the load transfer circuit through the pair of electrodes, the third spark gap switch, and an inductor to ground. In a further variant, a fourth spark gap switch receives a fourth high voltage trigger signal to shunt delivery of the negative phase of the biphasic waveform to the pair of electrodes. In still another aspect of this embodiment, the source capacitor has a capacitance value of approximately 50 nF and the load capacitor has a capacitance value of approximately 20 nF. In another aspect, the source capacitor has a capacitance value of approximately 1 uF and the load capacitor has a capacitance value of approximately 50 nF.

In another embodiment of the present disclosure, an electrode channel for generating biphasic waveforms for irreversible electroporation is provided, comprising: a charge transfer source circuit including a source capacitor and configured to receive an input voltage and a pulse train which causes pulses of the input voltage to be applied to the source capacitor, thereby charging the source capacitor to a source voltage; a charge transfer load circuit including a load capacitor; a switching circuit coupled to the charge transfer source circuit and the charge transfer load circuit; a first electrode coupled to the switching circuit; and a second electrode coupled to the switching circuit and the load capacitor; wherein the switching circuit further includes a plurality of spark gap switches configured to be activated by trigger signals to generate a biphasic waveform including a positive phase wherein the source voltage of the source capacitor is discharged through tissue in contact with the first and second electrodes to charge the load capacitor, and a negative phase wherein the load capacitor is discharged through the tissue. In one aspect of this embodiment, the switching circuit further includes two waveshaping inductors coupled to source capacitor. In a variant of this aspect, one inductor is coupled to a first spark gap switch and another inductor is coupled to a second spark gap switch. In another aspect, a first spark gap switch receives a first trigger signal to begin application of the positive phase of the biphasic waveform to the first and second electrodes and to begin charging the load capacitor. In a variant of this aspect, a second spark gap switch receives a second trigger signal to shunt delivery of the positive phase of the biphasic waveform. In a further variant, after a pause period, a third spark gap switch receives a third trigger signal to provide the negative phase of the biphasic waveform by discharging the load capacitor of the load transfer circuit through the first and second electrodes, the third spark gap switch, and an inductor to ground. In still a further variant, a fourth spark gap switch receives a fourth trigger signal to shunt delivery of the negative phase of the biphasic waveform to the first and second electrodes. In another aspect of this embodiment, the source capacitor has a capacitance value of approximately 50 nF and the load capacitor has a capacitance value of approximately 20 nF. In another aspect, the source capacitor has a capacitance value of approximately 1 uF and the load capacitor has a capacitance value of approximately 50 nF.

In yet another embodiment, the present disclosure provides a method for generating a biphasic waveform for application in irreversible electroporation, comprising: applying a voltage supply to a source capacitor to charge the source capacitor to a source voltage; triggering a first spark gap switch coupled to the source capacitor through a first inductor to discharge the source voltage as an applied voltage through a pair of electrodes in contact with tissue and to charge a load capacitor to a load voltage; after a first time period beginning at the triggering of the first spark gap switch, triggering a second spark gap switch coupled to the source capacitor through a second inductor to shunt delivery of the applied voltage; after a second time period beginning at the triggering of the second spark gap switch, triggering a third spark gap switch to provide a path for discharging the load voltage of the load capacitor through the pair of electrodes and a third inductor to ground; and after a third time period beginning at the triggering of the third spark gap switch, triggering a fourth spark gap switch to shunt delivery of the load voltage. In one aspect of this embodiment, applying the voltage supply to the source capacitor includes connecting the voltage supply through a switch to the source capacitor until a current imbalance between the voltage supply and the source capacitor becomes balanced. Another aspect further comprises after a fourth time period beginning at the triggering of the fourth spark gap switch. In another aspect, the first time period is approximately 2 usecs, the second time period is approximately 1 usec, and the third time period is approximately 2 usecs.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
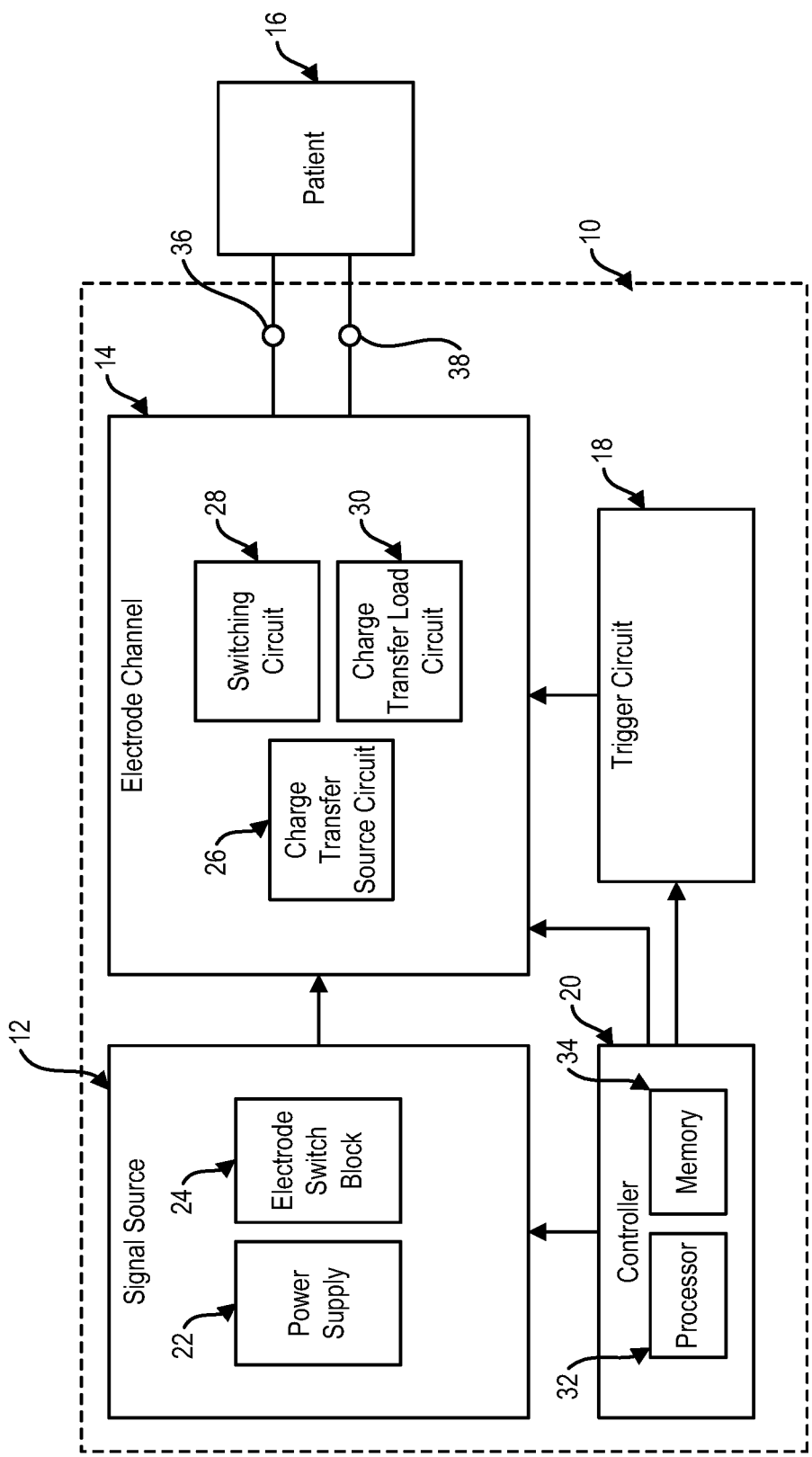
FIG. 1 is a block diagram of an exemplary system for generating and delivering PFA therapy according to embodiments of the present disclosure.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the invention as defined by the appended claims.

DETAILED DESCRIPTION

Described herein are systems, devices, and methods for signal generation such as for delivery of pulsed electric waveforms to ablate tissue by irreversible electroporation ("IRE"). A system for ablating tissue as described herein may include a signal source and one or more ablation devices having one or more electrodes for the selective and rapid application of DC voltage to drive electroporation. The pulse waveforms disclosed herein may aid in therapeutic treatment of a variety of cardiac arrhythmias (e.g., atrial fibrillation) and enhance the safety (by limiting the energy source and its delivery), efficiency (by reducing the size of the device and providing the ability to distribute the energy delivery circuit close to the electrodes) and effectiveness (by eliminating the need for control loop mechanisms for voltage and current) of energy delivery to the tissue. Generally, the systems, devices, and methods described herein may be used to provide a fail-proof, hazard reducing approach for pulse field ablation ("PFA"). In certain embodiments, a charge delivery circuit for a PFA generator is provided that delivers biphasic waveforms of a predetermined finite charged energy that provides inherent patient and operation isolation.

The term "electroporation" as used herein refers to the application of an electric field to a cell membrane to change the permeability of the cell membrane to the extracellular environment. The term "irreversible electroporation" ("IRE") as used herein refers to the application of an electric field to a cell membrane to permanently change the permeability of the cell membrane to the extracellular environment. For example, a cell undergoing irreversible electroporation may observe the formation of one or more pores in its cell membrane that persist upon removal of the electric field.

As is further described below, the embodiments disclosed herein use spark gap switches for delivering high-speed switching of high voltage signals for IRE therapy on myocyte tissue. The spark gap switches are arranged in a so-called A-bridge topology (as opposed to conventional H-bridge devices) whereby the charge transfer mechanism is inherently contained to minimize the difference between output impedance and load impedance thereby reducing high voltage requirements.

The spark gap switches described herein are triggered cold cathode gas tubes with two high-power electrodes and a trigger electrode. Before being triggered, spark gap switches present a low capacitance and very high impedance and do not conduct electricity. After triggering, the gas between the high-power electrodes turns to plasma according to the Townsend discharge process and conducts electricity. The impedance drops to a few ohms or less. The conditions necessary for initiation of the transition of the gas to plasma are predicted by Paschen's law, which describes the boundary between increasing and decreasing electron density in a spark gap. This boundary, with avalanche of electron density on one side and non-conducting gap on the other side is generally described as a straight line in the pressure-voltage plane referred to as the breakdown voltage. Crossing from one state to the other (i.e., crossing Paschen's line from gas to plasma) requires triggering the switch by either decreasing the pressure or increasing the voltage.

In a triggered spark gap switch as used in the present disclosure, the switch may be activated by a midplane trigger electrode positioned between the high-power electrodes on an equipotential surface of the electric field between the electrodes. Changing the voltage of the trigger electrode to any value other than halfway between the electrodes distorts the electric field and causes Townsend discharge.

Alternatively, a triggered spark gap switch may be triggered using a trigatron geometry, such as a trigger pin inside one of the high-power electrodes called the adjacent electrode. Driving the trigger pin with the same polarity as the adjacent electrode increases the field strength between the trigger pin and the opposite electrode. This increased field strength results in breakdown wherein an arc crosses the distance between the electrodes. Either triggering method provides extremely fast switching causing the spark gap switch to transition from presenting teraohms of resistance in the circuit to milliohms in a matter of nanoseconds. In certain embodiments, trigatron triggering is used because it requires a higher trigger voltage (i.e., approximately double that of midplane triggering) which provides a safety feature of preventing accidental discharge of the switch. It should be understood, however, that any type of triggered spark gap switch is contemplated by the disclosure. Any of a variety of different gas mixtures may be used to fill the gap of the spark gap switch, including but not limited to fluorocarbons combined with low molecular weight, inert buffer gases and a third gas with a low ionization potential relative to the buffer gas. In certain embodiments, argon or xenon are used to fill the sealed tube between the high-power electrodes.

Referring now to FIG. 1, system 10 according to one embodiment of the disclosure generally includes a signal source 12, at least one electrode channel 14 to deliver a voltage pulse waveform to a patient 16, a trigger circuit 18, which is electrically coupled to electrode channel 14, and a controller 20. As is further described below, signal source 12 generally includes a power supply 22 and an electrode switch block 24. Electrode channel 14, which is electrically coupled to signal source 12, generally includes a charge transfer source circuit 26, a switching circuit 28 and a charge transfer load circuit 30. Controller 20 generally includes a processor 32 and a memory 34 accessible by the processor 32 as further described herein. As shown, controller 20 is in communication with signal source 12, electrode channel 14 and trigger circuit 18. The output of electrode channel 14 is connected to a pair of electrodes 36, 38 which deliver the PFA therapy to tissue of patient 16.

Figure 2:
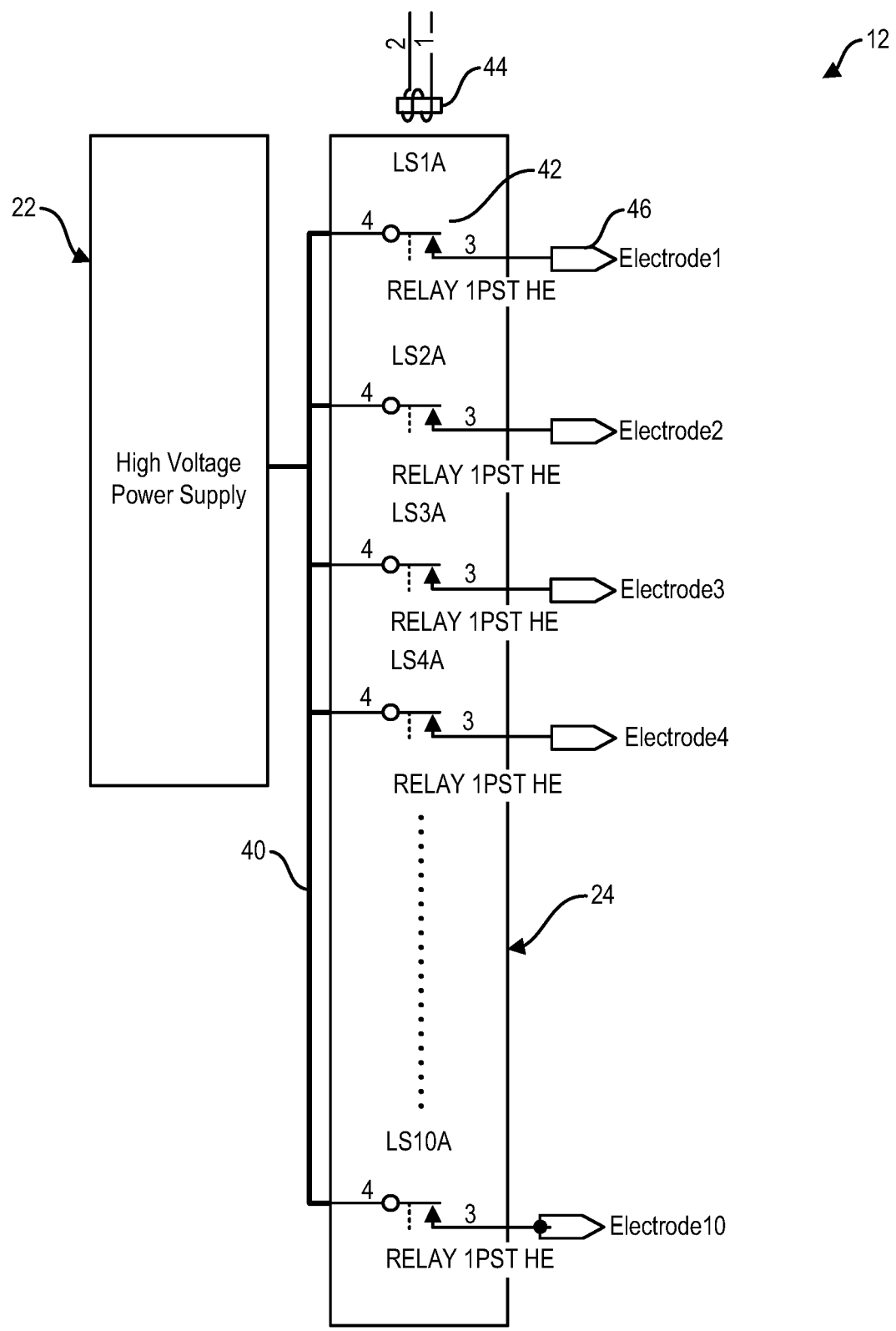
FIG. 2 is a circuit diagram of signal sources as depicted in FIG. 1 according to a first embodiment of the present disclosure.

Signal source 12 is depicted in greater detail in FIG. 2. As shown, power supply 22 is coupled to electrode switch block 24 by a power bus 40. In this manner, high voltage power is provided to the input node of each of a plurality of relays 42 (five shown), which are switched under control of controller 20 using coil 44 in a manner known in the art. As such, high voltage power is controllably switched to each of a plurality of electrode inputs 46, each of which being connected to an output node of a corresponding relay 42. In the depicted embodiment, ten electrode connections are indicated. It should be understood that more or fewer electrode inputs 46 may be supplied in other embodiments of signal source 12.

Figure 3:
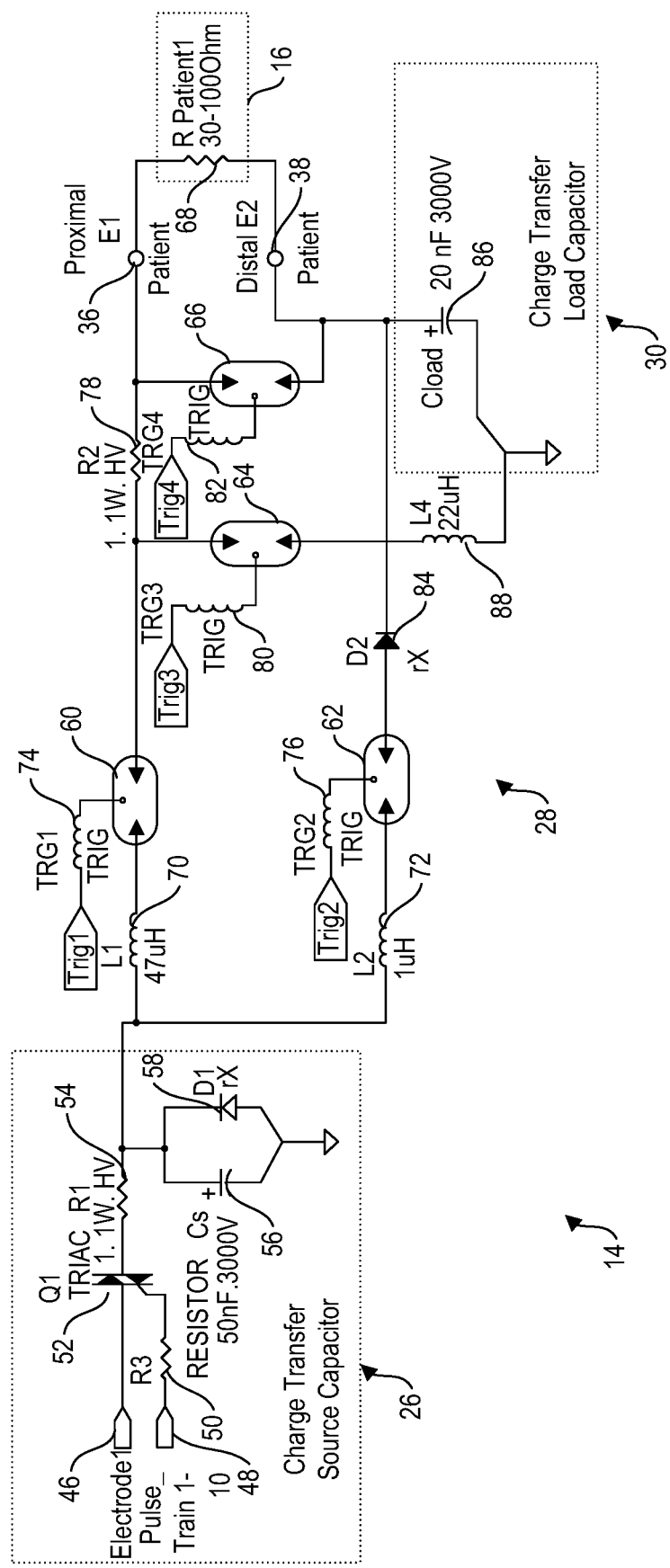
FIG. 3 is a circuit diagram of an electrode channel as depicted in FIG. 1 according to the first embodiment of the present disclosure.

Referring now to FIG. 3, a detailed circuit diagram of one of a plurality of electrode channels 14 of a multi-electrode catheter is shown. It will be appreciated by those skilled in the art that the present disclosure incorporates, in part, predetermined fixed LC values which may be ratiometrically adjusted to accomplish high or low pulse width characteristic waveforms of less than 1 usec or up to 20 usec. The maximum efficiency of treatment with ablation as described herein is a function, in part, of determining an optimum output energy and waveform creation. Wave shaping in the embodiments described herein is performed, at least in part, using series induction to compensate for droop decay in the discharging of the source and load capacitors. It should be understood that the disclosed embodiments may be used with multiple electrode pairs 36, 38, each with their own dedicated switching network topologies to provide staggered therapy administration within the same refractory cycle of a cardiac rhythm or to maintain flexibility of synchronization of the next pacing signal at the start of the refractory cycle of the cardiac rhythm.

As described above with reference to FIG. 1, electrode channel 14 generally includes charge transfer source circuit 26, switching circuit 28 and charge transfer load circuit 30. Charge transfer source circuit 26 includes as inputs electrode channel input 46 (see FIG. 2) and pulse train input 48. The pulse train signal at pulse train input 48 is generated by controller 20 (e.g., an FPGA) and passed through a resistor 50 connected to the gate of TRIAC 52. The voltage at electrode channel input 46 is connected to an input terminal of TRIAC 52, the output of which is connected through resistor 54 to a source capacitor 56 connected in parallel with a diode 58. An initial pulse of pulse train signal latches TRIAC 52 in the ON state, where it remains for as long as there is a current imbalance between the electrode channel input 46 and source capacitor 56. In this manner, TRIAC 52 controllably transfers power (according to the pulse train signal 48 at the gate of TRIAC 52) to charge source capacitor 56 to a source voltage. In one embodiment, the source voltage is approximately 3000 V. The source voltage stored in source capacitor 56 is provided to switching circuit 28 in the manner described below.

Switching circuit 28 generally includes a plurality of spark gap switches 60, 62, 64, 66 connected in an A-Bridge configuration to provide controlled biphasic voltage waveforms to a pair of electrodes (i.e., proximal electrode 36 and distal electrode 38) placed in contact with tissue of patient 16. In this example, the resistance (i.e., resistor 68) of the tissue of patient 16 between electrodes 36, 38 is estimated to be nominally 30 ohms or in a range of resistance from approximately 10 ohms to approximately 100 ohms. Examples of waveforms delivered to patients modeled as having tissue resistance of 10, and 100 ohms are described below. The switching of spark gap switches 60, 62, 64, 66 is controlled by the output of trigger circuit 18 as shown in one example in FIG. 4.

The output of charge transfer source circuit 26 is connected to a first inductor 70 and a second inductor 72. First inductor 70 is also connected to a first high-power electrode of first spark gap switch 60. Similarly, second inductor 72 is connected to a first high-power electrode of a second spark gap switch 62.

A first trigger signal "Trig1" (from trigger circuit 18 described below) is passed through an inductor 74 to the trigger electrode of first spark gap switch 60. A second trigger signal "Trigg" is also passed through an inductor 76 to the trigger electrode of second spark gap switch 62 according to a triggering sequence described herein. The second high-power electrode of first spark gap switch 60 is connected a first high-power electrode of third spark gap switch 64 and to one side of resistor 78. The other side of resistor 78 is connected to a first high-power electrode of fourth spark gap switch 66, and to proximal electrode 36. A third trigger signal "Trig3" is passed through an inductor 80 to the trigger electrode of third spark gap switch 64 and a fourth trigger signal "Trig4" is passed through an inductor 82 to the trigger electrode of fourth spark gap switch 66 according to the triggering sequence described herein. The second high-power electrode of second spark gap switch 62 is connected to the anode of steering diode 84. The cathode of diode 84 is connected to load capacitor 86 of charge transfer load circuit 30, the second high-power electrode of fourth spark gap switch 66, and distal electrode 38. The second high-power electrode of third spark gap switch 64 is connected to inductor 88. The return leg of inductor 88 is connected to ground.

Figure 4:
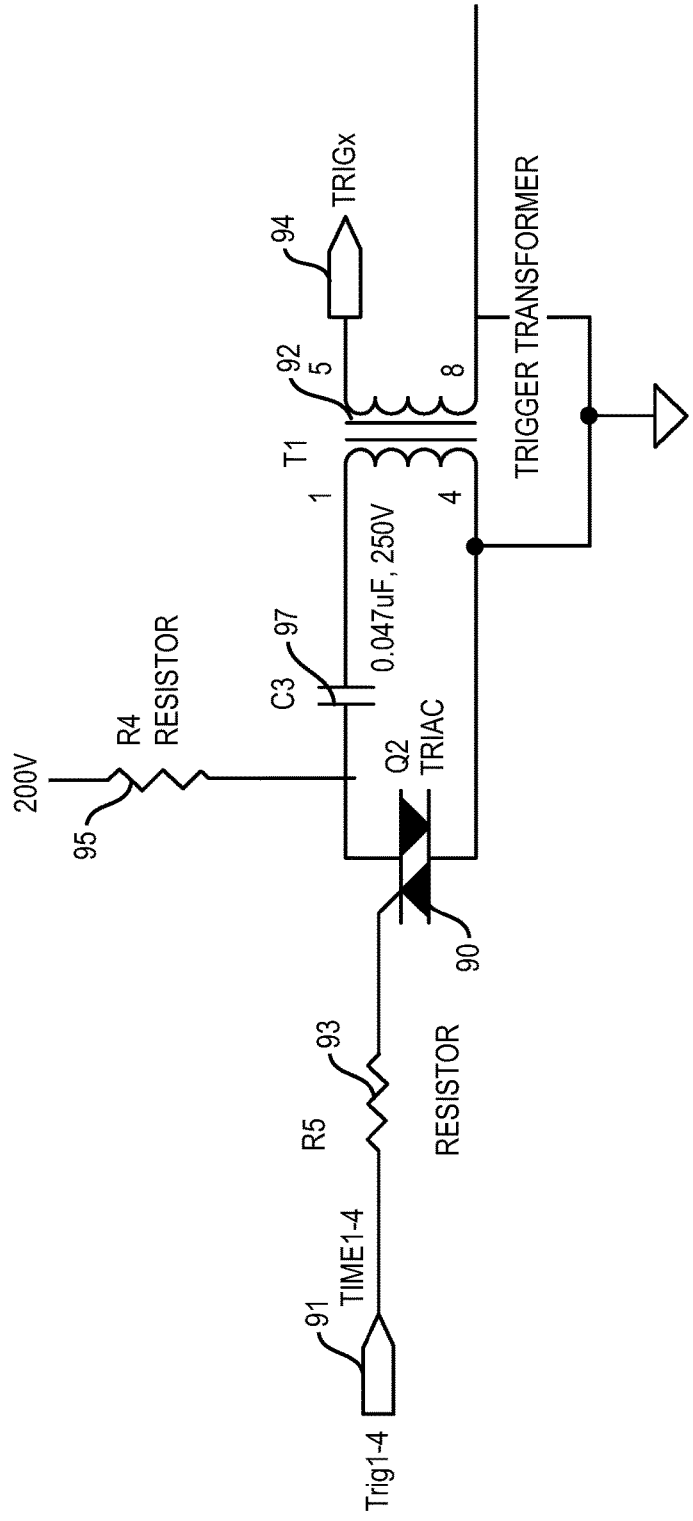
FIG. 4 is a circuit diagram of a prior art trigger circuit as depicted in FIG. 1.

A general application trigger circuit 18 is depicted in FIG. 4. Trigger initiation signals (Trig1-4) are generated by controller 20 and provided as inputs to trigger circuit 18. Trigger circuit 18 is known in the art and therefore will not be described in detail herein. In general, by causing the switching of TRIAC 90 using the trigger initiation signals at input 91 connected to the gate of TRIAC 90 through resistor 93, the high voltage transformer 92 is able to step up the 200 VDC supply voltage (routed through resistor 95 and capacitor 97) to generate very high voltage trigger signals (Trig1, Trig2, Trig3 and Trig4) at output 94 to provide to the trigger electrodes of spark gap switches 60, 62, 64, 66, respectively. The trigger signals, in certain embodiments, may be approximately 7000 volts to ionize the gases in spark gap switches 60, 62, 64, 66.

Controller 20 controls operation of signal source 12, electrode channel 14 and trigger circuit 18 to cause the application of biphasic voltage waveforms to electrodes 36, 38 to provide irreversible electroporation of tissue in contact with electrodes 36, 38. More specifically, processor 32 of controller 20 performs various operations as described herein upon execution of instructions stored in memory 34.

In some embodiments, processor 32 may be any suitable processing device configured to run and/or execute a set of instructions or code and may include one or more data processors, image processors, graphics processing units, physics processing units, digital signal processors, and/or central processing units. Processor 32 may be, for example, a general purpose processor, Field Programmable Gate Array (FPGA), a complex programmable logic device (CPLD), an Application Specific Integrated Circuit (ASIC), and/or the like. Processor 32 may be configured to run and/or execute application processes and/or other modules, processes and/or functions associated with the system and/or a network associated therewith (not shown). In some embodiments, processor 32 may comprise both a microcontroller unit and an FPGA unit, with the microcontroller sending electrode sequence instructions to the FPGA. The underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, and/or the like.

In some embodiments, memory 34 may include a database (not shown) and may be, for example, a random access memory (RAM), a memory buffer, a hard drive, an erasable programmable read-only memory (EPROM), an electrically erasable read-only memory (EEPROM), a read-only memory (ROM), Flash memory, etc. Memory 34 may store instructions to cause processor 32 to execute modules, processes and/or functions associated with system 10, such as pulse waveform generation, electrode channel configuration, fault detection, energy discharge, and/or cardiac pacing.

Generally speaking, the transfer of charge to patient 16 is accomplished through use of two capacitors (i.e., source capacitor 56 and load capacitor 86) to initiate a first, positive phase of a biphasic pulse waveform and a second, negative phase. Voltage supplied from high voltage power supply 22 to source capacitor 56 is switched repeatedly using TRIAC 52 to recharge source capacitor 56 for the number of pulse cycles needed. Load capacitor 86 delivers the negative duty cycle when the second phase is initiated. This approach to delivering finite energy to the tissue may enable reducing or tuning the number of repetition cycles.

More specifically, controller 20 causes signal source 12 to provide high voltage to each of electrode channels 14 and supplies pulse train control signals 1-10 to result in the charging of source capacitor 56. The high voltage stored on source capacitor 56 is discharged by triggering spark gap switches 60, 62, 64, 66 with the high voltage trigger signals Trig1 to Trig4 generated by trigger circuit 18 in a manner that provides biphasic voltage waveforms to electrodes 36, 38.

More specifically, after source capacitor 56 of charge transfer source circuit 26 is charged to the power supply source voltage, Trig1 signal is first provided through inductor 74 to the trigger electrode of first spark gap switch 60. This causes first spark gap switch 60 to begin conducting electricity. As each of spark gap switches are make-only circuits, first spark gap switch 60 continues conduction until the heat in its gap is depleted, which may be on the order of tens of microseconds. The high voltage output of first spark gap switch 60 is provided through a damping resistor 78 to proximal electrode 36, through the patient's tissue (i.e., resistor 68) and to load capacitor 86, which begins charging load capacitor 86 for delivery of the second phase of the biphasic waveform. In certain embodiments, after a period of approximately 2 usecs after the triggering of first spark gap switch 60, trigger circuit 18 provides the Trig2 signal through inductor 76 to the trigger electrode of second spark gap switch 62, thereby causing second spark gap switch 62 to conduct electricity and shunt delivery of the first phase of the biphasic waveform to proximal electrode 36. After a hold-off or pause period of approximately 1 usec in certain embodiments, the first half or positive conduction phase of the biphasic waveform is completed.

After the hold-off or pause period, trigger circuit 18 provides the Trig3 signal through inductor 80 to the trigger electrode of third spark gap switch 64 to begin providing the negative pulse of the biphasic waveform from load capacitor 86 of charge transfer load circuit 30. This portion of the biphasic waveform is provided from load capacitor 86 to distal electrode 38, through the patient's tissue (i.e., resistor 68), through resistor 78, third spark gap switch 64 and inductor 88 to ground. In certain embodiments, approximately 2 usecs after third spark gap switch 64 is triggered, trigger circuit 18 provides the Trig4 signal through inductor 82 to the trigger electrode of fourth spark gap switch 66, thereby causing fourth spark gap switch 66 to conduct electricity and shunt delivery of the second, negative phase of the biphasic waveform to distal electrode 38.

In the embodiment of electrode channel 14 depicted in FIG. 3, source capacitor 56 is 50 nF, load capacitor 86 is 20 nF, and the high source voltage across source capacitor 56 is approximately 3000 volts. In certain embodiments, source capacitor 56 and load capacitor 86 are high quality, high voltage, low ESR capacitors. Examples include polyester film capacitors, polypropelene capacitors, polycarbonate capacitors, electrolytic capacitors and ceramic capacitors. In the depicted embodiment, inductor 70 is 47 uH, inductor 72 is 1 uH and inductor 88 is 22 uH. It should be understood that TRIAC 52 of charge transfer source circuit 26 may alternatively be replaced with an insulated-gate bipolar transistor ("IGBT"). In the embodiment of FIGS. 2-4, electrode channel 14 delivers a finite energy amount to varied tissue impedance and the waveshape of the biphasic pulse has a softer dV/dt characteristic as a result of the conditioning networks used. The therapy energy delivered in voltage-seconds to the patient 16 is mostly constant, generally independent of tissue impedance (i.e., modeled as resistor 68), and primarily a function of conduction time. It should be understood that a source capacitor 56 of 50 nF may be estimated to provide energy (according to $E=(\frac{1}{2} Cs)V^2$) of 200 milli Joules ("mJ") per cycle. The estimated tissue dissipation (according to $E=Pt=I^2Rt$, where R is 10 to 100 ohms, and nominally 30 ohms) is 32,400 W*(20 usec/800 msec) or 27 to 81 mJ. The energy delivered to the load is approximately one half of the 200 mJ source energy, or 100 mJ. It should be understood that the energy delivered to the load (i.e., patient 16) remains substantially constant regardless of the load impedance of the myocyte tissue of patient 16. In general, a substantially constant output voltage is estimated as $V_{load}=[C_{load}/(C_{load}-C_S)]V_{source}$.

Figure 5:
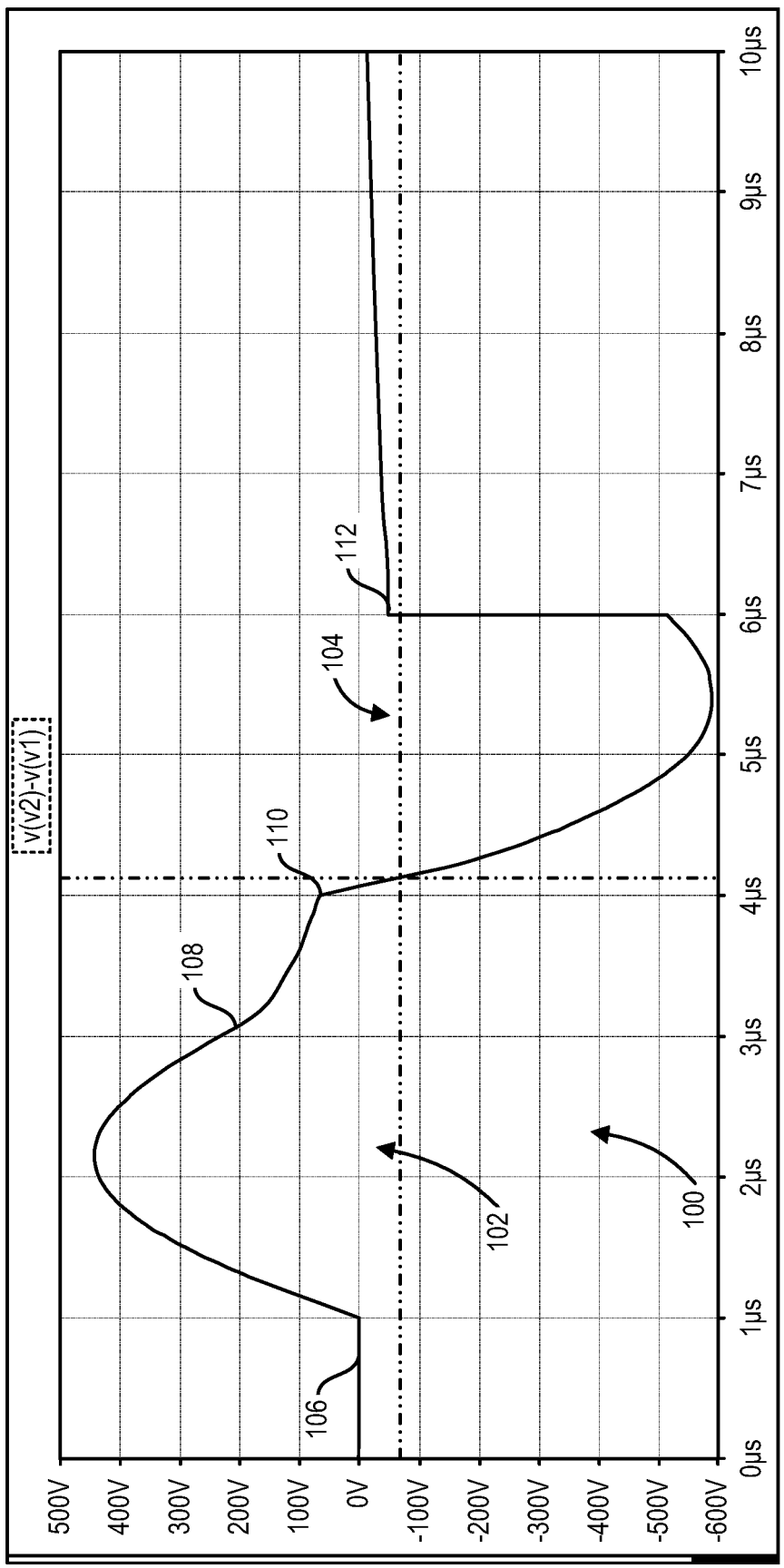
FIG. 5 is a graphic depiction of a biphasic waveform generated by the first embodiment of the present disclosure for delivery to a patient with a tissue resistance of ohms.

Referring now to FIG. 5, a first example of a biphasic waveform generated by system 10 as described above and applied to patient 16 is shown. In this example, tissue resistance 68 of patient 16 is modeled as 10 ohms. As shown, waveform 100 includes a positive phase 102 and a negative phase 104. Positive phase 102 starts at point 106 when first spark gap switch 60 is triggered, causing the voltage applied to the tissue to increase. Approximately 2 usecs later, second spark gap switch 62 is triggered at point 108, shunting delivery of the applied voltage to the tissue. After a 1 usec pause beginning at point 108, during which the applied voltage continues to decrease, the positive phase 102 of waveform 100 transitions at point 110 as third spark gap switch 64 is triggered to begin negative phase 104. Approximately 2 usecs later, at point 112, fourth spark gap switch 66 is triggered, shunting the delivery of negative phase 104 by essentially creating a short circuit across electrodes 36, 38.

As indicated above, waveform 100 of FIG. 5 is modeled for a patient resistance (i.e., resistor 68) of 10 ohms. The source voltage is 3000 volts. The total energy delivered to patient 16 is 74 mJ. The peak positive voltage is approximately 450 V and the peak negative voltage is approximately −600 V. The net average voltage across the patient's tissue is approximately −44 V (imbalance) over a period of 6 usec. Consequently, the average voltage delivered to patient 16 is 1052 V and the RMS voltage delivered to patient 16 is 1562 V.

Figure 6:
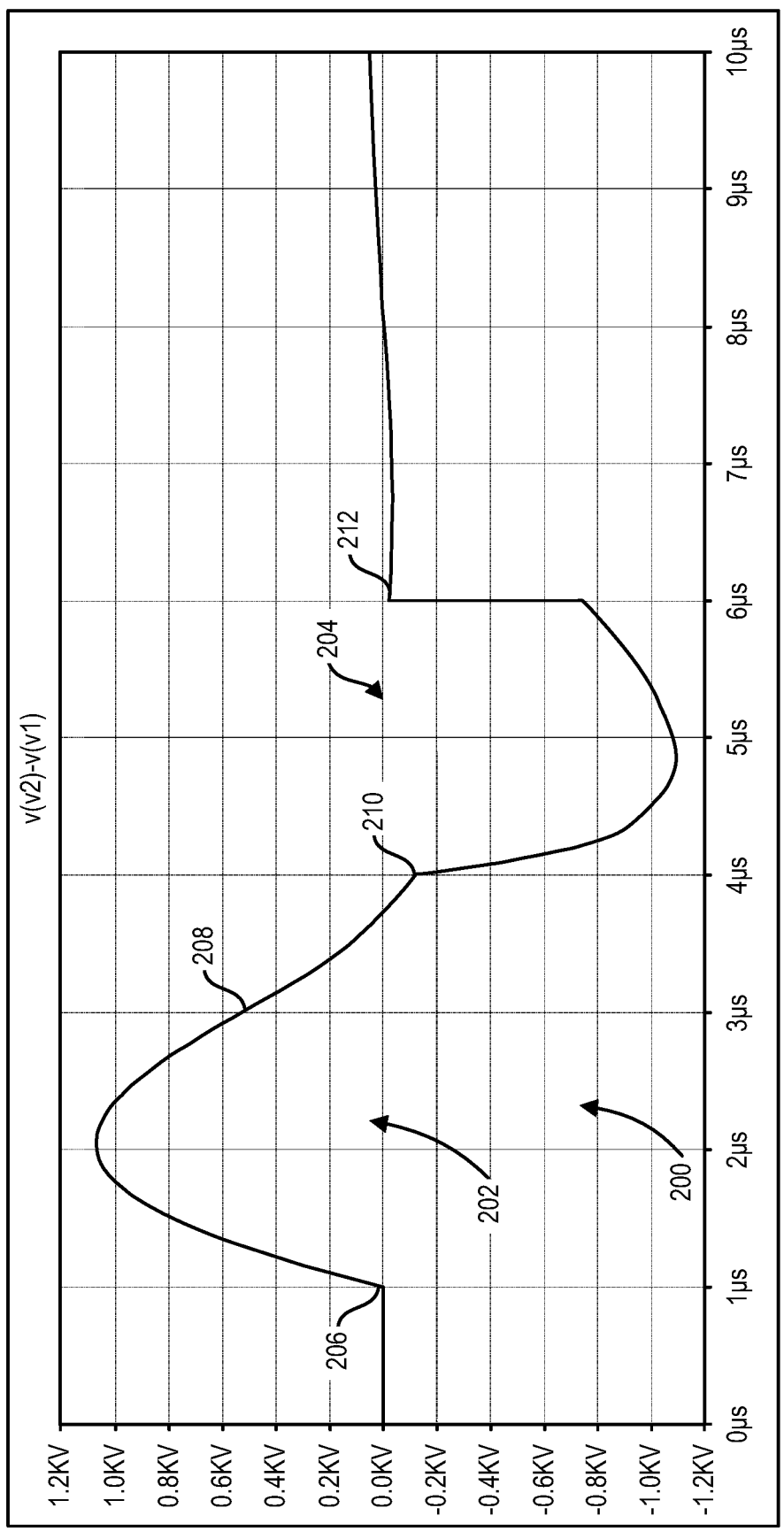
FIG. 6 is a graphic depiction of a biphasic waveform generated by the first embodiment of the present disclosure for delivery to a patient with a tissue resistance of ohms.

FIG. 6 depicts another example of a biphasic waveform 200 generated by system 10 as described above and applied to patient 16. In this example, resistance 68 of patient 16 is modeled as 30 ohms. As shown, waveform 200 includes a positive phase 202 and a negative phase 204. Positive phase 202 starts at point 206 when first spark gap switch 60 is triggered, causing the voltage applied to the tissue to increase. Approximately 2 usecs later, second spark gap switch 62 is triggered at point 208, shunting delivery of the applied voltage to the tissue. After a 1 usec pause beginning at point 208, during which the applied voltage continues to decrease, positive phase 202 of waveform 200 transitions at point 210 as third spark gap switch 64 is triggered to begin negative phase 204. Approximately 2 usecs later, at point 212, fourth spark gap switch 66 is triggered, shunting the delivery of negative phase 204 by essentially creating a short circuit across electrodes 36, 38.

As indicated above, waveform 200 of FIG. 6 is modeled for a patient resistance (i.e., resistor 68) of 30 ohms instead of 10 ohms as for waveform 100 of FIG. The same source voltage of 3000 volts is assumed. The total energy delivered to patient 16 is 100 mJ. The peak positive voltage is approximately 1100 V and the peak negative voltage is approximately −1100 V. The net average voltage across the patient's tissue is approximately −25 V (imbalance) over a period of 6 usec.

Figure 7:
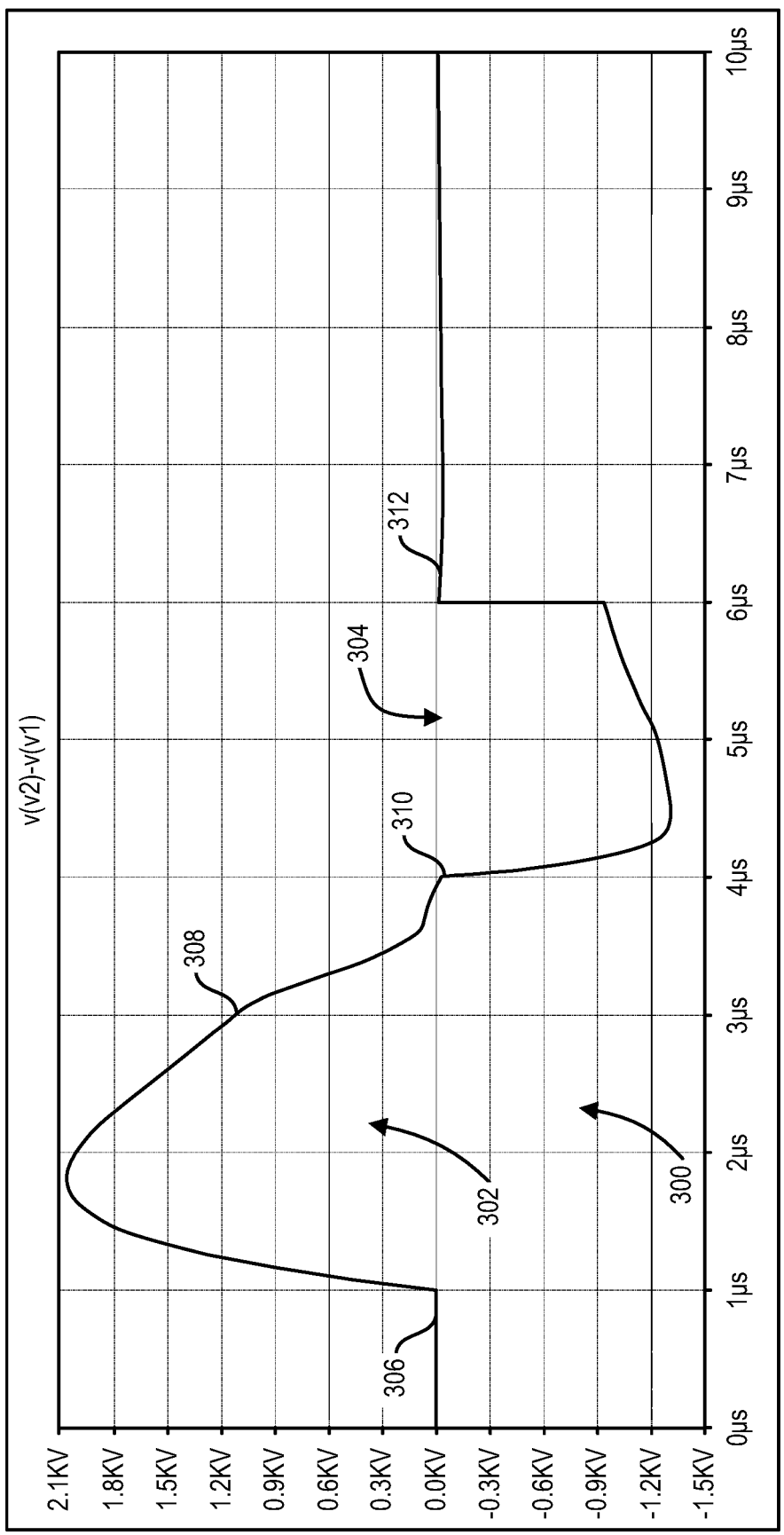
FIG. 7 is a graphic depiction of a biphasic waveform generated by the first embodiment of the present disclosure for delivery to a patient with a tissue resistance of 100 ohms.

FIG. 7 depicts yet another example of a biphasic waveform 300 generated by system 10 as described above and applied to patient 16. In this example, resistance 68 of patient 16 is modeled as 100 ohms. As shown, waveform 300 includes a positive phase 302 and a negative phase 304. Positive phase 302 starts at point 306 when first spark gap switch 60 is triggered, causing the voltage applied to the tissue to increase. Approximately 2 usecs later, second spark gap switch 62 is triggered at point 308, shunting delivery of the applied voltage to the tissue. After a 1 usec pause beginning at point 308, during which the applied voltage continues to decrease, the positive phase 302 of waveform 300 transitions at point 310 as third spark gap switch 64 is triggered to begin negative phase 304. Approximately 2 usecs later, at point 212, fourth spark gap switch 66 is triggered, shunting the delivery of negative phase 204 by essentially creating a short circuit across electrodes 36, 38.

As indicated above, waveform 300 of FIG. 7 is modeled for a patient resistance (i.e., resistor 68) of 100 ohms. The same source voltage of 3000 volts is assumed. The total energy delivered to patient 16 is 82.9 mJ. The peak positive voltage is approximately 2100 V and the peak negative voltage is approximately −1300 V. The net average voltage across the patient's tissue is approximately 133 V (imbalance) over a period of 6 usec.

The topology of system 10 described above (and the topology of system 400 described below) to conduct PFA provides significant advantages over prior art approaches. The use of spark gap switches 60, 62, 64, 66 provides a substantial reduction in the size and cost of the ablation device. Spark gap switches 60, 62, 64, 66 are extremely fast, and able to transition to the conduction phase and very low impedance as a result of breakdown voltage across the high-power electrodes in approximately 30 ns to 300 ns. Moreover, spark gap switches 60, 62, 64, 66 provide inherent barrier isolation with a very high hold-off voltage and low leakage. In certain embodiments, the resistance of spark gap switches 60, 62, 64, 66 in the non-conducting state is greater than 1000 Mohms and the capacitance is 1-5 pF. Additionally, because lower values may be used for source capacitor 56 and load capacitor 86 compared to conventional systems, line losses are minimized as a result of the low ESR and ESL characteristics of the circuit. Consequently, the need for a large number of bulk size capacitors is reduced. Additionally, system 10 delivers a predetermined amount of energy to the tissue of patient 16. Moreover, in the approach described herein multiple electrodes can be charged in sequence or alternatively, be pre-charged by their own dedicated switching network topologies to provide staggered therapy administration within a cardiac rhythm.

Figure 8:
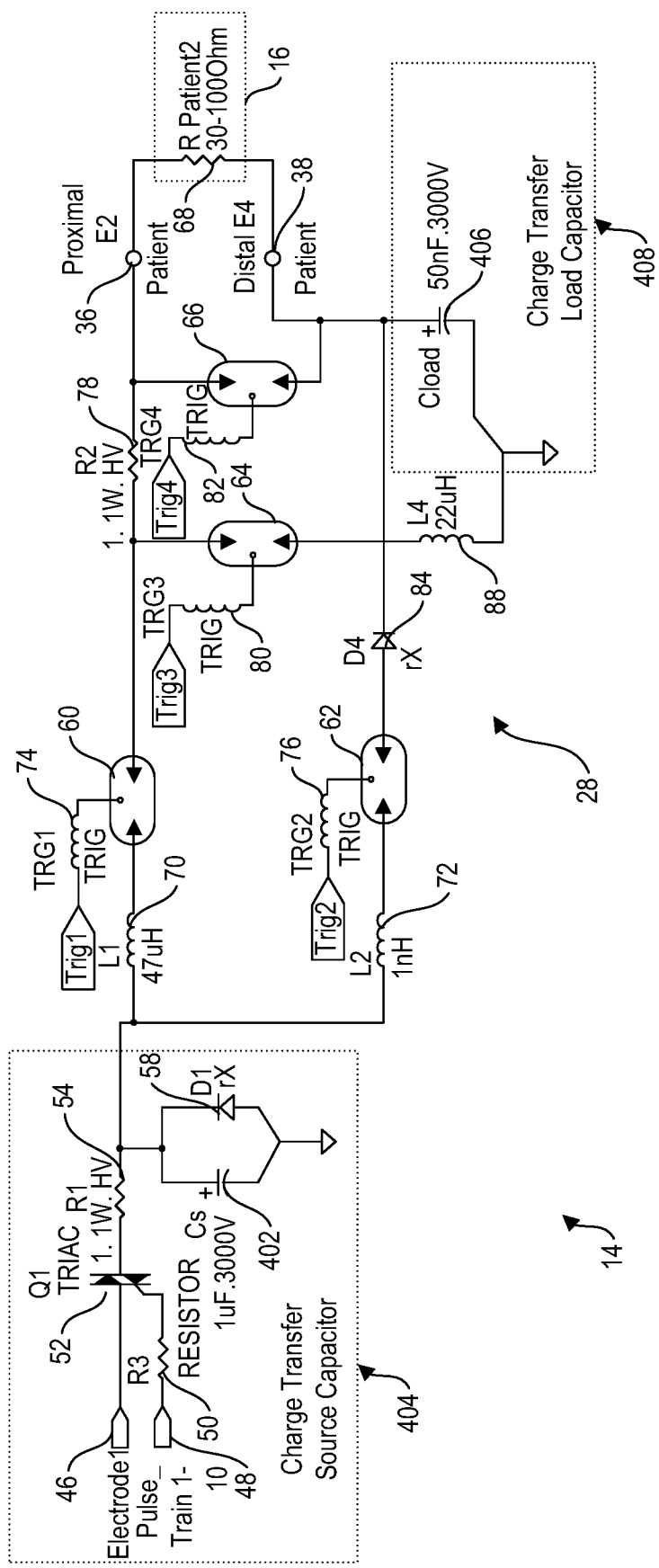
FIG. 8 is a circuit diagram of an electrode channel as depicted in FIG. 1 according to the second embodiment of the present disclosure.

Referring now to FIG. 8, another embodiment of an electrode channel for providing tissue ablation using irreversible electroporation is shown. Electrode channel 400 is used in conjunction with all of the basic components of system 10 (depicted in FIGS. 1-4). For simplicity, the descriptions of signal source 12, trigger circuit 18 and controller 20 are not repeated here. In general, the differences depicted between electrode channel 14 of FIG. 3 and electrode channel 400 of FIG. 8 are the values for the source capacitor and the load capacitor. As such, a detailed description of the configuration of electrode channel 400 is not repeated here. In electrode channel 400, source capacitor 402 of charge transfer source circuit 404 is 1 uF (instead of 50 nF as in electrode channel 14) and load capacitor 406 of charge transfer load circuit 408 is 50 nF (instead of 20 nF as in electrode channel 14). In the description below, the same reference designations used in FIGS. 1-4 are used for identical components.

The operation of electrode channel 400 is the same as the operation of system 10 described above. However, electrode channel 400 provisions more energy than is delivered to patient 16. Also, electrode channel 400 delivers energy and voltage levels that are increasingly higher with reduced tissue impedance. As will be described below, the biphasic waveforms generated have a steeper slope that delivers higher dV/dt pulses as a result of the different LC combinations (i.e., the differences in the values of the source capacitor and the load capacitor). In this embodiment, the therapy energy delivered (voltage-seconds) is a function of variable staggering of conduction time, voltage setting and tissue impedance which allows for fine tuning of the output energy to adjust for a specific load impedance.

It should be understood that a source capacitor 408 of 1 uF and a load capacitor 412 of 50 nF may be estimated to provide energy (according to $E=(½ Cs)V^2$) of 4.5 Joules per cycle. The estimated tissue dissipation (according to $E=Pt=I^2Rt$, where R is 10 to 100 ohms, and nominally 30 ohms) is substantially lower than that of system 10. It should be understood that the energy delivered to the load (i.e., patient 16) is not a direct function of source energy, but is more related to the turn-on and turn-off time of the waveform and the voltage per usec delivered for patient resistances of 10, 30 and 100 ohms is approximately 377 mJ, 286 mJ and 183 mJ, respectively. As such, the energy delivered is substantially inversely proportional to the tissue impedance of patient 16.

Figure 9:
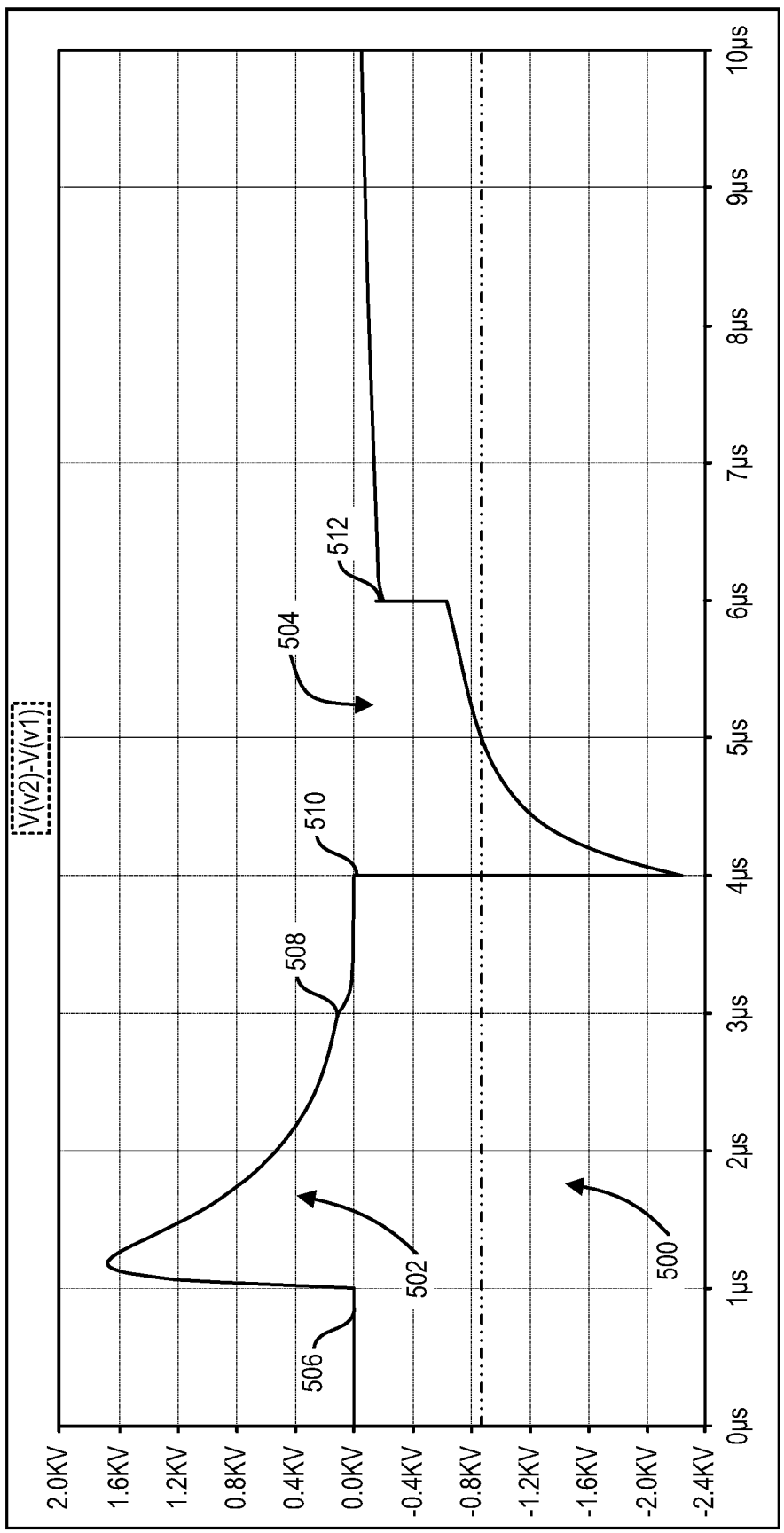
FIG. 9 is a graphic depiction of a biphasic waveform generated by the second embodiment of the present disclosure for delivery to a patient with a tissue resistance of 10 ohms.

Referring now to FIG. 9, a first example of a biphasic waveform generated by electrode channel 400 as described above and applied to patient 16 is shown. In this example, resistance 68 of patient 16 is modeled as 10 ohms. As shown, waveform 500 includes a positive phase 502 and a negative phase 504. Positive phase 502 starts at point 506 when first spark gap switch 60 is triggered, causing the voltage applied to the tissue to increase. Approximately 2 usecs later, second spark gap switch 62 is triggered at point 508, shunting delivery of the applied voltage to the tissue. After a 1 usec pause beginning at point 508, during which the applied voltage continues to decrease, the positive phase 502 of waveform 500 transitions at point 510 as third spark gap switch 64 is triggered to begin negative phase 504. Approximately 2 usecs later, at point 512, fourth spark gap switch 66 is triggered, shunting the delivery of negative phase 504 by essentially creating a short circuit across electrodes 36, 38.

As indicated above, waveform 500 of FIG. 9 is modeled for a patient resistance (i.e., resistor 68) of 10 ohms. The source voltage is 3000 volts. The total energy delivered to patient 16 is 377 mJ. The peak positive voltage is approximately 1.7 KV and the peak negative voltage is approximately −2.2 KV. The net average voltage across the patient's tissue is approximately −106 V (imbalance) over a period of 6 usec.

Figure 10:
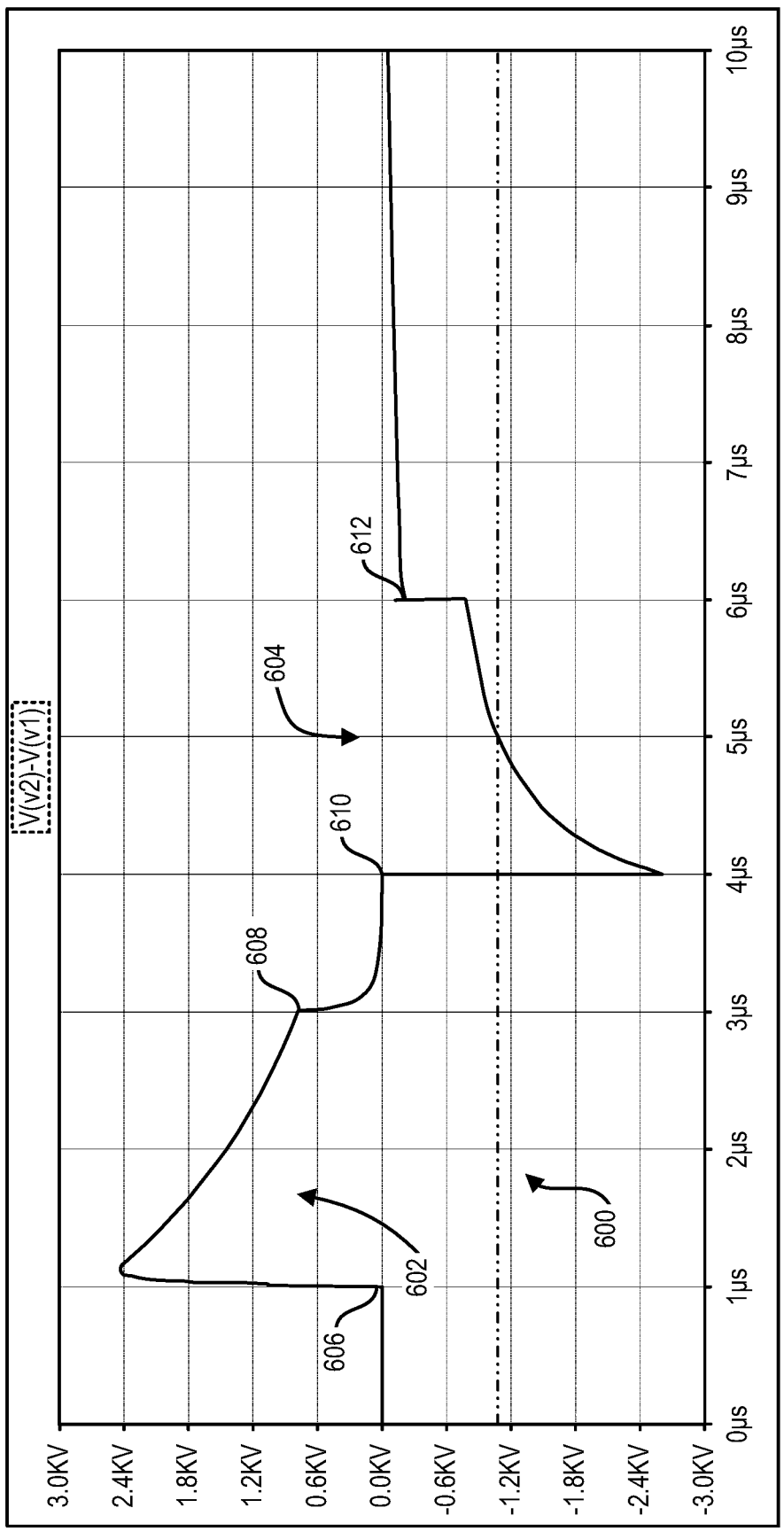
FIG. 10 is a graphic depiction of a biphasic waveform generated by the second embodiment of the present disclosure for delivery to a patient with a tissue resistance of 30 ohms.

FIG. 10 depicts another example of a biphasic waveform 600 generated by electrode channel 400 as described above and applied to patient 16. In this example, resistance 68 of patient 16 is modeled as 30 ohms. As shown, waveform 600 includes a positive phase 602 and a negative phase 604. Positive phase 602 starts at point 606 when first spark gap switch 60 is triggered, causing the voltage applied to the tissue to increase. Approximately 2 usecs later, second spark gap switch 62 is triggered at point 608, shunting delivery of the applied voltage to the tissue. After a 1 usec pause beginning at point 608, during which the applied voltage continues to decrease, the positive phase 602 of waveform 600 transitions at point 610 as third spark gap switch 64 is triggered to begin negative phase 604. Approximately 2 usecs later, at point 612, fourth spark gap switch 66 is triggered, shunting the delivery of negative phase 604 by essentially creating a short circuit across electrodes 36, 38.

As indicated above, waveform 600 of FIG. 10 is modeled for a patient resistance (i.e., resistor 68) of 30 ohms instead of 10 ohms as for waveform 500 of FIG. The same source voltage of 3000 volts is assumed. The total energy delivered to patient 16 is 286 mJ. The peak positive voltage is approximately 2.4 KV and the peak negative voltage is approximately −2.6 KV. The net average voltage across the patient's tissue is approximately 13 V (imbalance) over a period of 6 usec.

Figure 11:
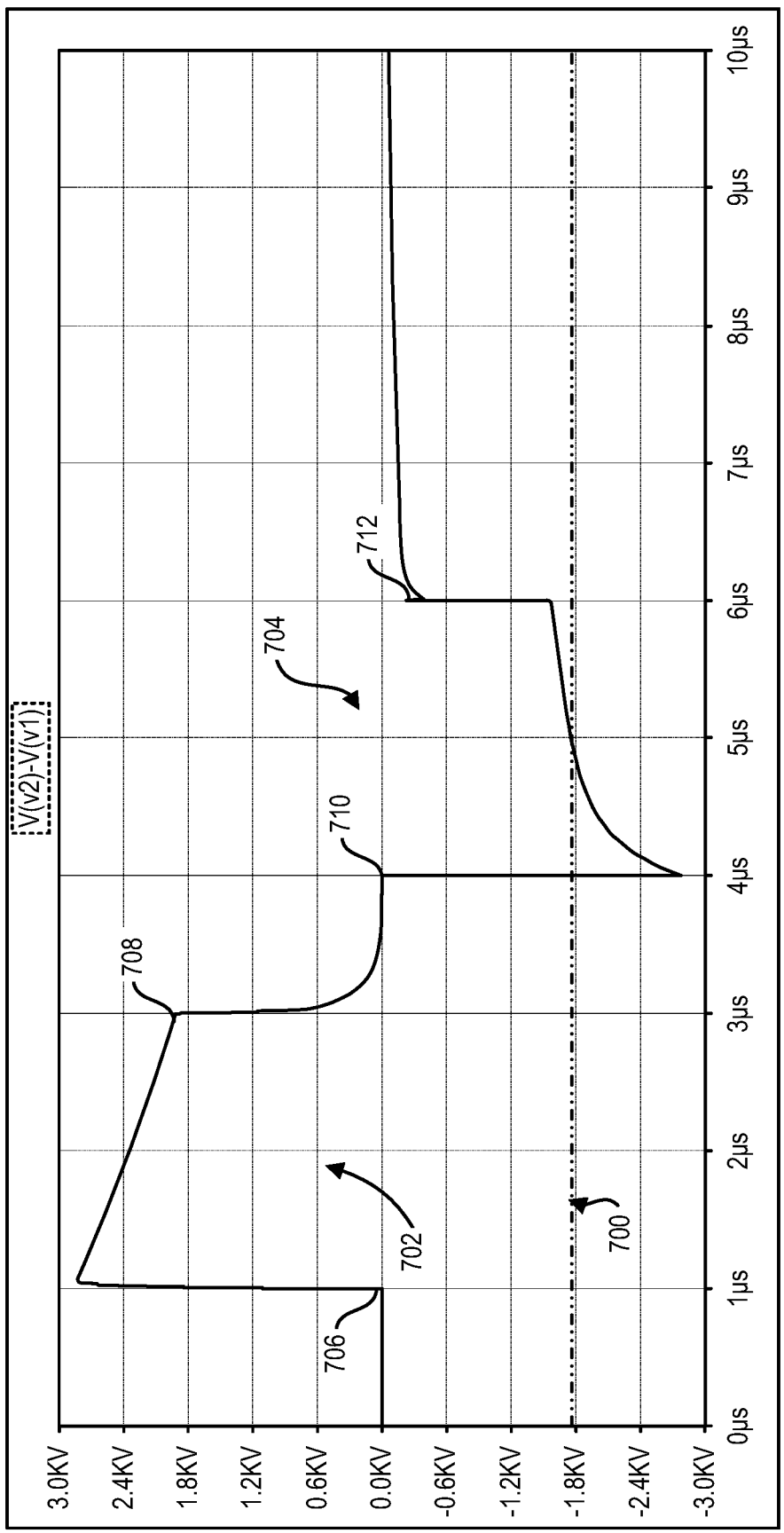
FIG. 11 is a graphic depiction of a biphasic waveform generated by the second embodiment of the present disclosure for delivery to a patient with a tissue resistance of 100 ohms.

FIG. 11 depicts yet another example of a biphasic waveform 700 generated by electrode channel 400 as described above and applied to patient 16. In this example, resistance 68 of patient 16 is modeled as 100 ohms. As shown, waveform 700 includes a positive phase 702 and a negative phase 704. Positive phase 702 starts at point 706 when first spark gap switch 60 is triggered, causing the voltage applied to the tissue to increase. Approximately 2 usecs later, second spark gap switch 62 is triggered at point 708, shunting delivery of the applied voltage to the tissue. After a 1 usec pause beginning at point 708, during which the applied voltage continues to decrease, the positive phase 702 of waveform 700 transitions at point 710 as third spark gap switch 64 is triggered to begin negative phase 704. Approximately 2 usecs later, at point 712, fourth spark gap switch 66 is triggered, shunting the delivery of negative phase 704 by essentially creating a short circuit across electrodes 36, 38.

Figure 12:
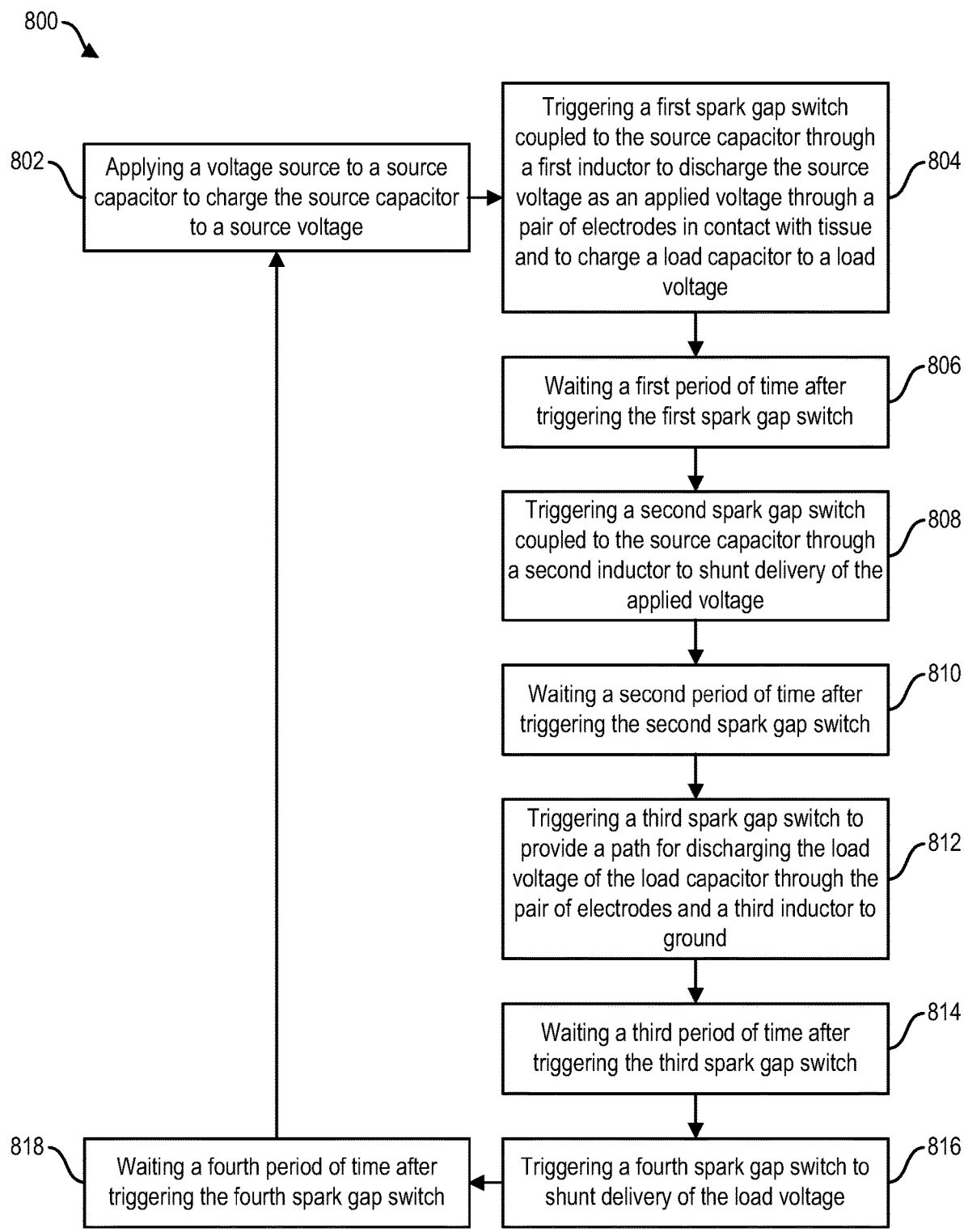
FIG. 12 is a flowchart depicting operation of the embodiments of the present disclosure.

As indicated above, waveform 700 of FIG. 12 is modeled for a patient resistance (i.e., resistor 68) of 100 ohms. The same source voltage of 3000 volts is assumed. The total energy delivered to patient 16 is 183 mJ. The peak positive voltage is approximately 2.8 KV and the peak negative voltage is approximately −2.7 KV. The net average voltage across the patient's tissue is approximately 64 V (imbalance) over a period of 6 usec.

Referring now to FIG. 12, a flowchart is depicted illustrating an exemplary method of generating and delivering a biphasic waveform for PFA according to embodiments of the present disclosure. As illustrated, method 800 begins at step 802 where a voltage source, such as electrode input signal 46 outputted by electrode block 24 of signal source 12, is applied to source capacitor 56, 402 to charge source capacitor 56, 402 to a source voltage, such as 3000 V. At step 804, a trigger signal is provided from trigger circuit 18 through inductor 74 to first spark gap switch 60 to cause the discharge of the source voltage as an applied voltage through electrodes 36, 38 and to load capacitor 86, 406 to begin charging of load capacitor 86, 406 for the negative phase of the biphasic waveform. At step 806, a delay of a first time period, such as 2 usecs in certain embodiments, is provided after the triggering of first spark gap switch 60. Then, at step 808 a trigger signal is provided from trigger circuit 18 through inductor 76 in the manner described above to second spark gap switch 62 to shunt the delivery of the applied voltage to electrodes 36, 38. At step 810, a delay of a second time period, such as 1 usec in certain embodiments, is provided after the triggering of second spark gap switch 62. Then, at step 812 a trigger signal is provided from trigger circuit 18 through inductor 80 to third spark gap switch 64 to provide a path for discharging the voltage (i.e., the load voltage) stored on load capacitor 86, 406 through electrodes 36, 38 and inductor 88 to ground. Again, after a delay of a third time period (step 814), such as 2 usecs in certain embodiments, a trigger signal is provided at step 816 from trigger circuit 18 through inductor 82 to fourth spark gap switch 66 to shunt delivery of the load voltage from load capacitor 86, 406 by essentially creating a short circuit across electrodes 36, 38 in the manner described above. Finally, after a delay of a fourth time period (step 818), such as 2 usecs in certain embodiments, the process is repeated for creation of additional biphasic waveforms. It should be understood by those skilled in the art that the time periods mentioned herein are nominal timings and may be adapted to achieve the desired efficacy requirements of any of a variety of applications.

In various embodiments, the waveform generators described herein can be incorporated in a cardiac ablation system usable by a clinician to treat or terminate cardiac arrythmias such as atrial fibrillation. In embodiments, the cardiac ablation system includes a cardiac ablation catheter having a plurality of electrodes operatively coupled to the waveform generator, the plurality of electrodes being addressable by the waveform generator to define one or more pairs of electrodes for bipolar delivery of ablative energy. In embodiments, the waveform generator is configured to selectively apply the biphasic waveform to the plurality of pairs of electrodes. Non-limiting examples of cardiac ablation catheters for use in the cardiac ablation system can be found, for example, in U.S. Pat. Nos. 10,173,673; 10,130,423 assigned to Farapulse, Inc., the disclosures of which are incorporated herein by reference for all purposes.

As used herein, the terms "about" and/or "approximately" when used in conjunction with numerical values and/or ranges generally refer to those numerical values and/or ranges near to a recited numerical value and/or range. In some instances, the terms "about" and "approximately" may mean within ±10% of the recited value. For example, in some instances, "about 100 [units]" may mean within ±10% of 100 (e.g., from 90 to 110). However, these terms may refer to a broader range such ±20%, ±30% or even ±40%. The terms "about" and "approximately" may be used interchangeably.

Some embodiments described herein relate to a computer storage product with a non-transitory computer-readable medium (also may be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also may be referred to as code or algorithm) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs); Compact Disc-Read Only Memories (CD-ROMs), and holographic devices; magneto-optical storage media such as optical disks; solid state storage devices such as a solid state drive (SSD) and a solid state hybrid drive (SSHD); carrier wave signal processing modules; and hardware devices that are specially configured to store and execute program code, such as Application-Specific Integrated Circuits (ASICs), Programmable Logic Devices (PLDs), Read-Only Memory (ROM), and Random-Access Memory (RAM) devices. Other embodiments described herein relate to a computer program product, which may include, for example, the instructions and/or computer code disclosed herein.

The systems, devices, and/or methods described herein may be performed by software (executed on hardware), hardware, or a combination thereof. Hardware modules may include, for example, a general-purpose processor (or microprocessor or microcontroller), a field programmable gate array (FPGA), and/or an application specific integrated circuit (ASIC). Software modules (executed on hardware) may be expressed in a variety of software languages (e.g., computer code), including C, C++, Java®, Python, Ruby, Visual Basic®, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

In some embodiments, the systems, devices, and methods may be in communication with other computing devices (not shown) via, for example, one or more networks, for example, local area networks (LAN), Internet area networks (IAN), or Controller Area Networks (CAN).

The specific examples and descriptions herein are exemplary in nature and embodiments may be developed by those skilled in the art based on the material taught herein without departing from the scope of the present invention, which is limited only by the attached claims.

Various modifications and additions can be made to the exemplary embodiments discussed without departing from the scope of the present invention to achieve the desired efficacy of treatment. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

I claim:

1. A pulse phase ablation biphasic generator for a cardiac ablation system, the pulse phase ablation biphasic generator comprising:
    a signal source circuit including a power supply and an electrode switch block configured to output a plurality of switched electrode input signals;
    a trigger circuit including a transformer configured to output a plurality of high voltage trigger signals;
    at least one electrode channel circuit including
        a charge transfer source circuit including a source capacitor and coupled to the signal source circuit to receive the plurality of switched electrode input signals, the charge transfer source circuit being configured to charge the source capacitor to a source voltage,
        a switching circuit coupled to the charge transfer source circuit to receive the source voltage and to the trigger circuit to receive the plurality of high voltage trigger signals, and
        a charge transfer load circuit including a load capacitor coupled to the switching circuit;
    wherein the switching circuit further includes a plurality of spark gap switches activated by the plurality of high voltage trigger signals to cause the electrode channel to apply a biphasic waveform to a pair of electrodes configured to contact tissue, the biphasic waveform including a positive phase generated by discharging the source voltage of the source capacitor and a negative phase generated by discharging the load capacitor.

2. The pulse phase ablation biphasic generator of claim 1, wherein the switching circuit further includes two wave-shaping inductors coupled to source capacitor, wherein one inductor is coupled to a first spark gap switch and another inductor is coupled to a second spark gap switch.

3. The pulse phase ablation biphasic generator of claim 1, wherein the charge transfer circuit includes a switch controlled by a controller to remain in an ON conduction state for as long as there is a current imbalance between the electrode input signal and the source capacitor.

4. The pulse phase ablation biphasic generator of claim 1, wherein a first spark gap switch receives a first high voltage trigger signal to begin application of the positive phase of the biphasic waveform to the pair of electrodes and to begin charging the load capacitor, and wherein a second spark gap switch receives a second high voltage trigger signal to shunt delivery of the positive phase of the biphasic waveform.

5. The pulse phase ablation biphasic generator of claim 4, wherein after a pause period, a third spark gap switch receives a third high voltage trigger signal to provide the negative phase of the biphasic waveform by discharging the load capacitor of the load transfer circuit through the pair of electrodes, the third spark gap switch, and an inductor to ground.

6. The pulse phase ablation biphasic generator of claim 5, wherein a fourth spark gap switch receives a fourth high voltage trigger signal to shunt delivery of the negative phase of the biphasic waveform to the pair of electrodes.

7. The pulse phase ablation biphasic generator of claim 1, wherein the source capacitor has a capacitance value of approximately 50 nanofarads and the load capacitor has a capacitance value of approximately 20 nanofarads.

8. The pulse phase ablation biphasic generator of claim 1, wherein the source capacitor has a capacitance value of approximately 1 microfarads and the load capacitor has a capacitance value of approximately 50 nanofarads.

9. An electrode channel for generating biphasic waveforms for irreversible electroporation, comprising:
    a charge transfer source circuit including a source capacitor and configured to receive an input voltage and a pulse train which causes pulses of the input voltage to be applied to the source capacitor, thereby charging the source capacitor to a source voltage;
    a charge transfer load circuit including a load capacitor;
    a switching circuit coupled to the charge transfer source circuit and the charge transfer load circuit;
    a first electrode coupled to the switching circuit; and
    a second electrode coupled to the switching circuit and the load capacitor;

wherein the switching circuit further includes a plurality of spark gap switches configured to be activated by trigger signals to generate a biphasic waveform including a positive phase wherein the source voltage of the source capacitor is discharged through tissue in contact with the first and second electrodes to charge the load capacitor, and a negative phase wherein the load capacitor is discharged through the tissue.

10. The electrode channel of claim 9, wherein the switching circuit further includes two waveshaping inductors coupled to source capacitor, wherein one inductor is coupled to a first spark gap switch and another inductor is coupled to a second spark gap switch.

11. The electrode channel of claim 9, wherein a first spark gap switch receives a first trigger signal to begin application of the positive phase of the biphasic waveform to the first and second electrodes and to begin charging the load capacitor.

12. The electrode channel of claim 11, wherein a second spark gap switch receives a second trigger signal to shunt delivery of the positive phase of the biphasic waveform.

13. The electrode channel of claim 12, wherein after a pause period, a third spark gap switch receives a third trigger signal to provide the negative phase of the biphasic waveform by discharging the load capacitor of the load transfer circuit through the first and second electrodes, the third spark gap switch, and an inductor to ground.

14. The electrode channel of claim 13, wherein a fourth spark gap switch receives a fourth trigger signal to shunt delivery of the negative phase of the biphasic waveform to the first and second electrodes.

15. The electrode channel of claim 9, wherein the source capacitor has a capacitance value of approximately 50 nF and the load capacitor has a capacitance value of approximately 20 nF.

16. The electrode channel of claim 9, wherein the source capacitor has a capacitance value of approximately 1 uF and the load capacitor has a capacitance value of approximately 50 nF.

17. A method for generating a biphasic waveform for application in irreversible electroporation, comprising:
applying a voltage supply to a source capacitor to charge the source capacitor to a source voltage;
triggering a first spark gap switch coupled to the source capacitor through a first inductor to discharge the source voltage as an applied voltage through a pair of electrodes in contact with tissue and to charge a load capacitor to a load voltage;
after a first time period beginning at the triggering of the first spark gap switch, triggering a second spark gap switch coupled to the source capacitor through a second inductor to shunt delivery of the applied voltage;
after a second time period beginning at the triggering of the second spark gap switch, triggering a third spark gap switch to provide a path for discharging the load voltage of the load capacitor through the pair of electrodes and a third inductor to ground; and
after a third time period beginning at the triggering of the third spark gap switch, triggering a fourth spark gap switch to shunt delivery of the load voltage.

18. The method of claim 17 wherein applying the voltage supply to the source capacitor includes connecting the voltage supply through a switch to the source capacitor until a current imbalance between the voltage supply and the source capacitor becomes balanced.

19. The method of claim 18, further comprising after a fourth time period beginning at the triggering of the fourth spark gap switch, repeating the steps of claim 17.

20. The method of claim 18, wherein the first time period is approximately 2 microseconds, the second time period is approximately 1 usec, and the third time period is approximately 2 microsecond.

* * * * *